US010067879B2

(12) United States Patent
Han et al.

(10) Patent No.: US 10,067,879 B2
(45) Date of Patent: Sep. 4, 2018

(54) APPARATUS AND METHOD TO SUPPORT A STORAGE MODE OVER A CACHE-LINE MEMORY INTERFACE TO A NON-VOLATILE MEMORY DUAL IN LINE MEMORY MODULE

(71) Applicant: Intel Corporation, Santa Clara, CA (US)

(72) Inventors: Woojong Han, Phoenix, AZ (US); Andy M. Rudoff, Boulder, CO (US); Mark A. Schmisseur, Phoenix, AZ (US); Richard P. Mangold, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 14/972,053

(22) Filed: Dec. 16, 2015

(65) Prior Publication Data

US 2017/0177496 A1    Jun. 22, 2017

(51) Int. Cl.
*G06F 12/08* (2016.01)
*G06F 12/1009* (2016.01)
*G06F 12/0877* (2016.01)
*G06F 12/0893* (2016.01)

(52) U.S. Cl.
CPC ...... *G06F 12/1009* (2013.01); *G06F 12/0877* (2013.01); *G06F 12/0893* (2013.01); *G06F 2212/152* (2013.01); *G06F 2212/608* (2013.01)

(58) Field of Classification Search
CPC ............. G06F 12/0877; G06F 12/0893; G06F 12/1009; G06F 2212/152; G06F 2212/608
See application file for complete search history.

(56) References Cited

U.S. PATENT DOCUMENTS

| | | | |
|---|---|---|---|
| 6,718,430 | B2 | 4/2004 | Lin et al. |
| 8,473,791 | B2 * | 6/2013 | Shaw .................. G06F 11/1666 714/6.1 |
| 2002/0124117 | A1 | 9/2002 | Beukema et al. |
| 2003/0018828 | A1 | 1/2003 | Craddock et al. |
| 2009/0077326 | A1 | 3/2009 | Motohashi |
| 2012/0203928 | A1 | 8/2012 | Gorodetsky et al. |
| 2016/0232103 | A1 * | 8/2016 | Schmisseur ............. G06F 13/16 |

OTHER PUBLICATIONS

Notification of Transmittal of the International Search Report and Written Opinion of the International Searching Authority, or the Declaration dated Feb. 22, 2017, pp. 2, for Serial No. PCT/US2016/062349.

(Continued)

*Primary Examiner* — Yong Choe
(74) *Attorney, Agent, or Firm* — Konrad Raynes Davda & Victor LLP; David W. Victor

(57) ABSTRACT

Provided are an apparatus and method for using block windows configured in a memory module to provide block level access to memory chips in the memory module. A plurality of block windows are configured that map to addresses corresponding to the addressable locations in the memory chips. A read/write request is received indicating a requested read or write operation with respect to a target block window comprising one of the block windows. The requested read or write operation is performed with respect to the addresses that map to the target block window.

25 Claims, 5 Drawing Sheets

(56) References Cited

OTHER PUBLICATIONS

PCT International Search Report dated Feb. 22, 2017, pp. 3, for Serial No. PCT/2016/062349.
Written Opinion of the International Searching Authority dated Feb. 22, 2017, pp. 9, for Serial No. PCT/US2016/062349.
Chang, J., et al., "NVDIMM-N Cookbook: A Soup-to-Nuts Primer on Using NVDIMM-Ns to Improve Your Storage Performance", © Storage Networking Industry Association, 41 pp.
Intel Corporation, "NVDIMM Block Window Driver Writer's Guide", Apr. 2015, 35 pp.
JEDEC, "DDR4 SDRAM", JEDEC Standard, JESD79-4, Sep. 2012, 214 pp.
JEDEC, "Double Data Rate (DDR) SDRAM Specification", JEDEC Standard, JESD79C, Mar. 2003, 82 pp.
JEDEC "High Bandwidth Memory (HBM) DRAM", JEDEC Standard, JESD235, Oct. 2013, 124 pp.
JEDEC, "Low Power Double Data Rate 3 (LPDDR3)", JEDEC Standard, JESD209-3C, Aug. 2015, 158 PP.
JEDEC, "Low Power Double Data Rate (LPDDR4)", JEDEC Standard, JESD209-4, Aug. 2014, 196 pp.
JEDEC, "Wide I/O 2 (WideIO2)", JEDEC Standard, JESD229-2, Aug. 2014, 116 pp. [Submitted as Parts A, B, and C due to EFS-Web file size restrictions].
"LIBNVDIMM: Non-Volatile Devices", [online], [Retrieved on Nov. 27, 2015], retrieved from the Internet at <URL: https://www.kernel.org/doc/Documentation/nvdimm/nvdimm.txt>, 13 pp.
International Preliminary Report on Patentability (IPRP) for International Application No. PCT/US2016/062349, dated Jun. 28, 2018, 11 pp.

\* cited by examiner

Block Window Control Registers

Protected Region Registers

Read/Write Request

Block Window Configuration Command

APPARATUS AND METHOD TO SUPPORT A STORAGE MODE OVER A CACHE-LINE MEMORY INTERFACE TO A NON-VOLATILE MEMORY DUAL IN LINE MEMORY MODULE

TECHNICAL FIELD

Embodiments described herein generally relate to an apparatus and method to support storage mode over a cache-line memory interface to a non-volatile memory dual in line memory module.

BACKGROUND

A dual in-line memory module (DIMM) comprises a series of dynamic random-access memory integrated circuits mounted on a printed circuit board. Data is accessed from the DIMM in units of cache lines over a cache-line memory interface. Transfer of a cache line requires consecutive access to the DIMM, which can be triggered by a single read or write command. The random-access memory integrated circuits may include volatile or non-volatile memory. A non-volatile memory retains data even when electrical power is removed. A block driver in the operating system may be used to access the NVDIMM address space.

There is a need in the art for providing improved techniques for accessing data in a memory module, such as a DIMM.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Described embodiments provide techniques for a memory module controller of a memory module, such as a Non-Volatile Dual In-Line Memory Module (NVDIMM), to provide a storage mode which allows a block driver in the host operating system to send block requests to block windows directly to the memory module controller of the memory module. In this way, the memory module provides block windows, command registers, and status registers to allow a block driver in the host operating system to send block requests in a storage mode. Further, with described embodiments, the memory module controller provides programmable block windows the storage block driver can use to send multiple read and write requests to the block windows in parallel to allow parallel execution of commands.

Described embodiments provide a memory module controller that configures a plurality of block windows that map to addresses corresponding to the addressable locations in the memory chips. Upon receiving a read/write request indicating a requested read or write operation with respect to a target block window, the memory module controller performs the requested read or write operation with respect to the addresses that map to the target block window.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
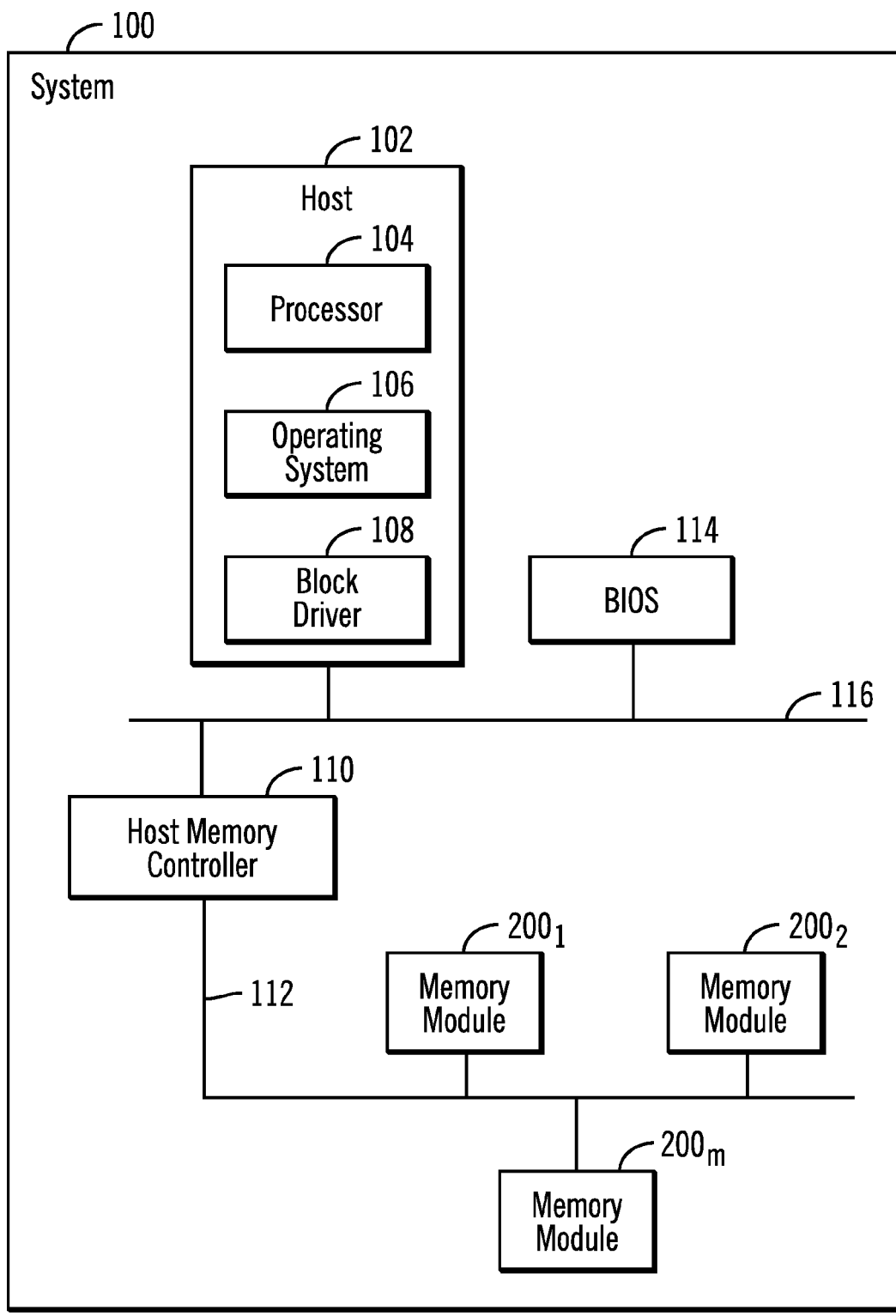
FIG. 1 illustrates an embodiment of a system with memory modules.

FIG. 1 illustrates an embodiment of a system 100 including a host 102 comprised of a processor 104 that executes an operating system 106 and a block driver 108 to manage read and write requests originating in the operating system 106 directed to one or more memory modules $200_1$, $200_2$ ... $200_m$. The block driver 108 may be part of the operating system 106. A host memory controller 110, in response to memory access requests from the block driver 108, communicates with the memory modules $200_1$, $200_2$ ... $200_m$ over a memory bus 112, also referred to as a channel, bus interface, etc. The host memory controller 110 includes logic to manage read and write operations and memory management operations with respect to the memory modules $200_1$, $200_2$ ... $200_m$ connected to the memory bus 112. The host 102, a Basic Input Operating System (BIOS) 114, and the host memory controller 110 may communicate over a system bus 116, such as a processor bus, fabric, ring or mesh architecture internal to the processor 104, e.g., central processing unit (CPU), Intel Corporation's KEIZER TECHNOLOGY INTERCONNECT® (KTI), an Open Core Protocol interconnect, and other types of standardized or proprietary interconnects. (Keizer Technology Interconnect is a registered trademark of Intel Corporation throughout the world). Other components may also be connected to the system bus 116, such as storage devices. The host 102 may load operating system 106 and block driver 108 code stored in the memory modules $200_1$, $200_2$ ... $200_m$ into a main memory to execute, or the memory modules $200_1$, $200_2$ ... $200_m$ may comprise the main memory used to store code and operands executed by the processor 104. The BIOS 114 may perform certain hardware initialization operations of hardware in the system 100, including initializing the host memory controller 110 and memory modules $200_1$, $200_2$ ... $200_m$. The host memory controller 110 may be integrated with the processor 104, such as a system on a chip (SOC), or implemented in logic separate from the processor 104 on the system 100 motherboard as shown in FIG. 1. The memory modules $200_1$, $200_2$ ... $200_m$ may support a memory protocol over the memory bus 112, such as JEDEC Double Data Rate Fourth Generation (DDR4) protocol.

In one embodiment, the memory modules $200_1$, $200_2$ ... $200_m$ may comprise a type of Dynamic Random Access Memories (DRAMs). In one embodiment, the memory modules $200_1$, $200_2$ ... $200_m$ may comprise Dual In-Line Memory Modules (DIMMs), such as unbuffered DIMMs (UDIMM), Load Reduced Dual-inline Memory Module (LRDIMM), a Small Outline Dual In-line Memory Module (SODIMM), etc. The memory modules $200_1$, $200_2$ ... $200_m$ may implement various forms of memory, including, but not limited to, non-volatile memory such as, NAND (flash) memory, ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, etc. In one embodiment, the memory modules $200_1$, $200_2$ ... $200_m$ may be a Non-Volatile Dual In-line Memory Module (NVDIMM) that comprise a non-volatile memory device.

The memory modules $200_1$, $200_2$ ... $200_m$ described herein may be compatible with a number of memory technologies, such as DDR3 (Dual Data Rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such specifications. The memory bus 12 may comprise a volatile memory standard bus e.g., JEDEC SDRAM memory bus or other suitable volatile or non-volatile memory busses known in the art.

The system 100 may also communicate with Input/Output (I/O) devices, which may comprise input devices (e.g., keyboard, touchscreen, mouse, etc.), display devices, graphics cards, ports, network interfaces, etc.

Figure 2:
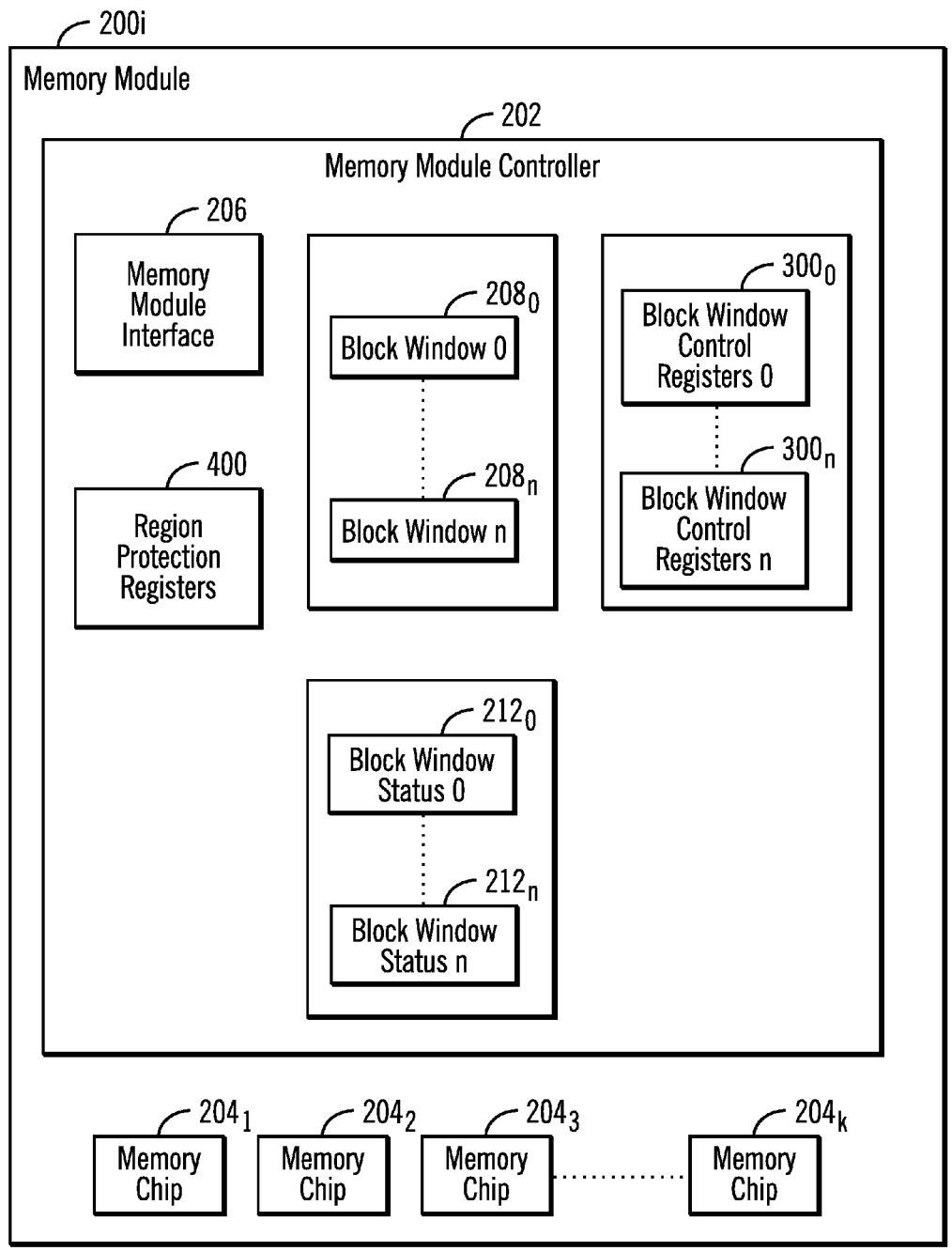
FIG. 2 illustrates an embodiment of a memory module.

FIG. 2 illustrates an embodiment of a memory module $200_i$ comprising one of the memory modules $200_1$, $200_2$ ... $200_m$ including a memory module controller 202 and a plurality of memory chips $204_1$, $204_2$ ... $204_3$, i.e., dies, on one or both sides of the memory module, to store the data. The memory chips located on one or both sides of the memory module $200_i$ package, comprise the storage elements to store data being used by the host 102. The memory module controller 202 includes a memory module interface 206 having the logic to manage read and write requests, and configure the memory module $200_i$ to provide a storage driver interface between the memory module $200_1$, $200_2$ ... $200_m$ and the block driver 108 in the host 102.

To configure the memory module $200_i$ to provide a storage driver interface, the memory module interface 206 configures a plurality of block windows $208_0$, ... $208_n$ comprising a block size, such as 4 Kilo Bytes (KB), 8 KB, etc, to which the block driver 108 can write blocks of data. The memory module interface 206 configures in the memory module controller 202, for each of the block windows $208_0$ ... $208_n$, block window control registers $300_0$ ... $300_n$ that define the block windows $208_0$ ... $208_n$ and block window status registers $212_0$ ... $212_n$ that provide status information on read and write operations with respect to the corresponding block windows $208_0$ ... $208_n$. The status information may indicate an error status of an access, a protection violation, e.g., access to a locked region, an uncorrectable data error, etc. The block driver 108 may access the status region status registers $212_0$ ... $212_n$ before using read data returned from a block windows $208_0$ ... $208_n$ or completing a write operation.

The block windows $208_0$ ... $208_n$ may comprise registers and storage areas in the memory module controller 202 that the memory module interface 206 uses to store the transferred blocks from the block driver 108, and then transfers the blocks from the block windows $208_0$ ... $208_n$ in the memory module controller 202 between the memory chips $204_1$, $204_2$ ... $204_3$ and the block driver 108.

The memory module interface 206 further provides region protection registers 400 to store information for regions of the memory addresses in which block windows may be configured. Once the block windows $208_0$ ... $208_n$ are configured, the block driver 108 can in parallel send commands to the block windows $208_0$ ... $208_n$, allowing for execution of n parallel commands. This allows the memory module $200_i$, which is designed for cache-line memory access, to function in a storage mode, such that the block driver 108 can directly access the memory chips $204_1$, $204_2$ ... $204_3$ as storage blocks, to allow a memory copy from the memory on the memory module $200_i$, through the block windows $208_0$ ... $208_n$ to an application data buffer in the host 102. Further, concurrent requests can be processed in parallel to addresses on different cache lines within one block window $208_i$ to allow parallel processing of commands directed to addresses within one block window.

Figure 3:
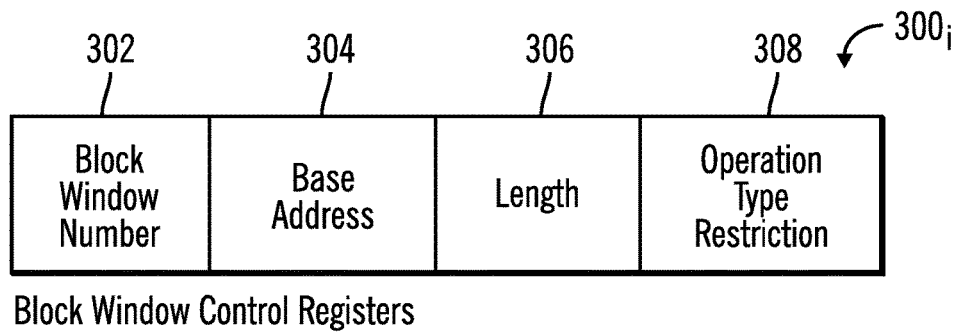
FIG. 3 illustrates an embodiment of block window control registers.

FIG. 3 illustrates an embodiment of block window control registers $300_i$, such as one of the block window control registers $300_0$ ... $300_n$, that define the block windows $208_0$ ... $208_n$. Block window control registers $300_i$ for one of the block windows $208_0$ ... $208_n$ includes a block window number 302 identifying the particular block window 0 ... n, a base address 304 providing a starting address of the block window 302 in the memory chips $204_1$, $204_2$ ... $204_3$, a length 306 of the block window, which may be the same or different for block windows $208_0$ ... $208_n$; and an operation type restriction 308 indicating a type of operation to which the block window 302 is restricted. The block window register $300_i$ information may be configured by the block driver 108a and/or the BIOS 114.

In an alternative embodiment, there may be no separate block window number 302, and instead the block window control registers $300_i$ include an offset from the base address 304 at which the block window resides.

Figure 4:
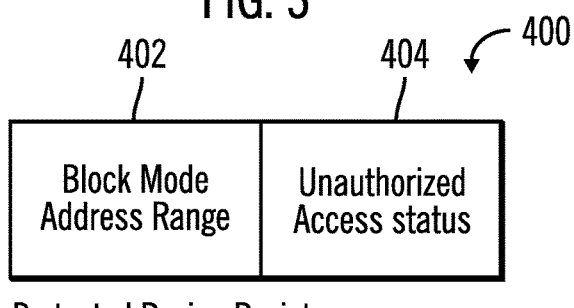
FIG. 4 illustrates an embodiment of protected region registers.

FIG. 4 illustrates an embodiment of the region protection registers 400 including a block mode address range 402 indicating an address range in the memory chips $204_1$, $204_2$ ... $204_k$ in which block windows may be configured and an unauthorized access status 404. Any attempt to configure block windows outside of the block mode address range 402 will result in an error that may be logged in the unauthorized access status 404, which may indicate the driver that tried to initiate the configuring of block windows in an address range outside of the block mode address range 402.

Figure 5:
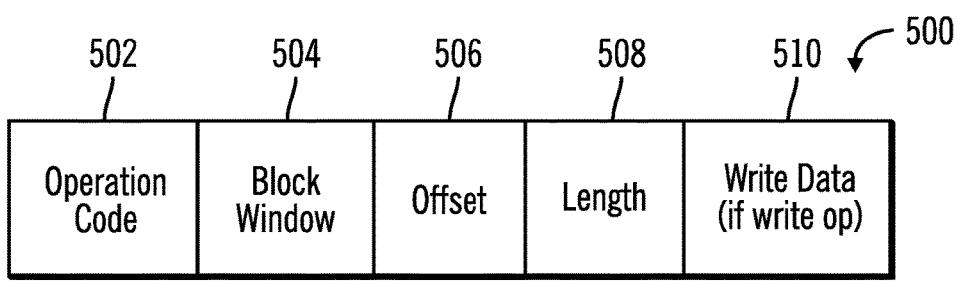
FIG. 5 illustrates an embodiment of a read/write request to a block window.

FIG. 5 illustrates an embodiment of a read or write request 500 which may be sent by the block driver 108 to the memory module interface 206 to perform a read or write to block of addresses in a memory module $200_i$ to simulate a storage type block access. The read or write request 500 may include an operation code 502 indicating the operation type, such as read or write; a block window number 504 identifying one of the block windows $208_0 \ldots 208_n$ to which the read or write is directed; an offset 506 within the block window 504 at which the operation is to start; a length 508 of the address range from the offset to which the operation applies; and write data 510 if the operation 502 is a write. In an alternative embodiment, there may be no block window 504 number and instead the offset 506 may directly identify the block window $208_0 \ldots 208_n$ location as an offset from the base address 304 for the block window $208_0 \ldots 208_n$ being accessed.

In alternative embodiments, some of the parameters of the read/write request 500 may be inherent in the transaction between the block driver 108 and the memory module $200_i$, such that the address identifies the block window rather than explicitly being part of a "command". Also the length 508 may not be in the command 500, but rather a transaction comprises a series of read or write commands to sequential cache line addresses that address a specific block window, and no length 506 is ever specified. For instance, 64 cache lines read sequentially would complete a 4 KB block read, and the block driver 108 determines the correct number of cache lines to access, not the memory module controller 202.

Figure 6:
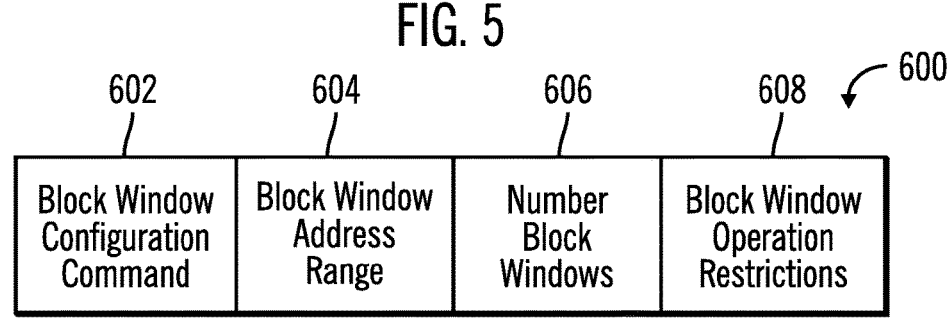
FIG. 6 illustrates an embodiment of a block window configuration command 600.

FIG. 6 illustrates an embodiment of a block window configuration command 600 sent by the block driver 104 to a memory module $200_i$ to configure block window control registers $300_0 \ldots 300_n$, including the block window configuration command 602; a block window address range 604 in which the block windows $208_0 \ldots 208_n$ are to be configured; a number of block windows 606; and for each block window to configure any block window operation restrictions 608, such as indicating for a particular block window $300_i$ whether only a specified type of operation, e.g., read, write, etc., is permitted to that block window $300_i$.

Figure 7:
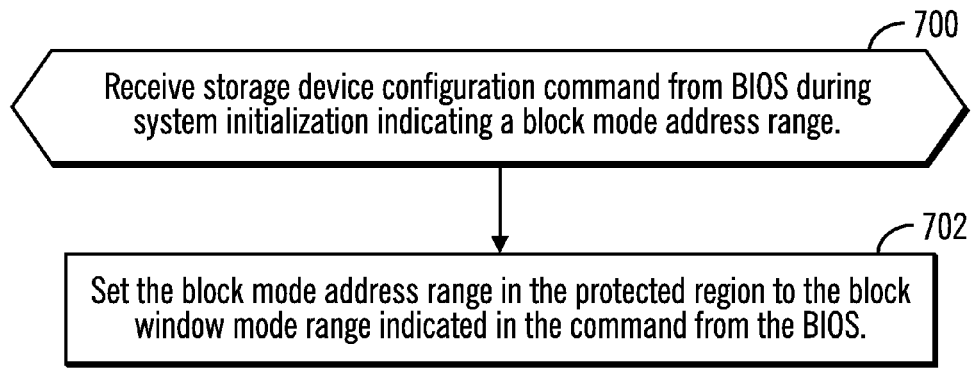
FIG. 7 illustrates an embodiment of operations to configure the protected region registers.

FIG. 7 illustrates an embodiment of operations performed by the memory module interface 206 in each of the memory modules $200_1, 200_2 \ldots 200_m$ to initialize the protected region 400 during system 100 initialization. Upon receiving (at block 700) during system 100 initialization a command from the BIOS 114 indicating a block mode address range in which block windows may be configured, the memory module interface 206 sets (at block 702) the block mode address range 402 in the protected region 400 to the block window mode address range indicated in the command from the BIOS 114. In alternative embodiments, different components may set the block mode address range 402 during system initialization.

Figure 8:
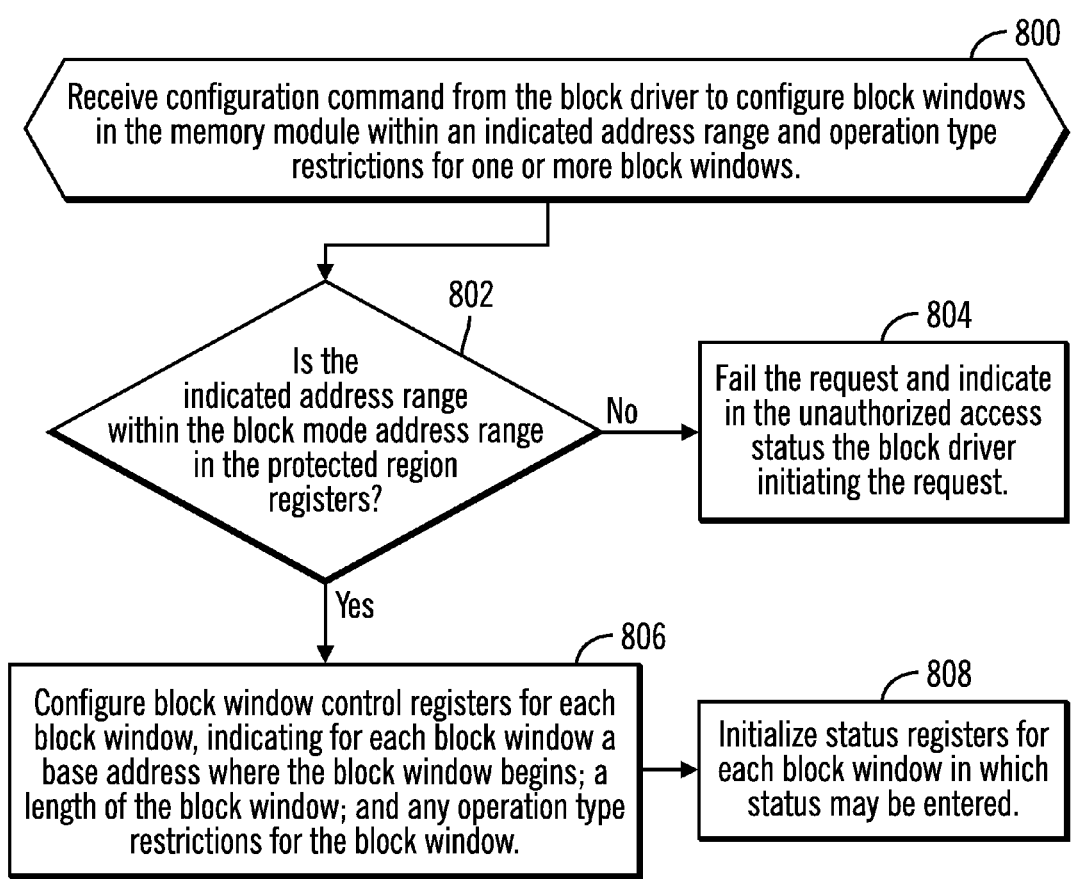
FIG. 8 illustrates an embodiment of operations to configure block windows in the memory module.

FIG. 8 illustrates an embodiment of operations performed by the memory module interface 206 in a memory module $200_i$ to process a configuration command 600 from the block driver 104. Upon receiving (at block 800) the configuration command 600 indicating the block window address range 604 in which the number of block windows 606 will be configured, including operation restrictions 608, the memory module interface 206 determines (at block 802) whether the indicated address range 604 is within the block mode address range 402 in the protected region registers 400. If not, then the request to configure the block windows is failed (at block 804) and the unauthorized status 404 is updated to indicate the block driver that initiated the request and other information about the request. If (at block 802) the requested address range 604 is within the block mode address range 402, then the memory module interface 206 configures (at block 806) block window control registers $300_0 \ldots 300_n$ for each block window, indicating for each block window a base address 304 where the block window begins; a length 306 of the block window; and any operation type restrictions 308 for the block window indicated in the operation restrictions 608 in the configuration request 600. The block window status registers $212_0 \ldots 212_n$ are initialized (at block 808) for each block window in which status may be entered during read and write operations to the blocks.

In FIG. 8, all the block windows maybe configured as part of a single command from the block driver 108 or flow or alternatively may be configured by separate commands from the block driver 108 for each block window $208_i$ to configure block windows individually.

Figure 9:
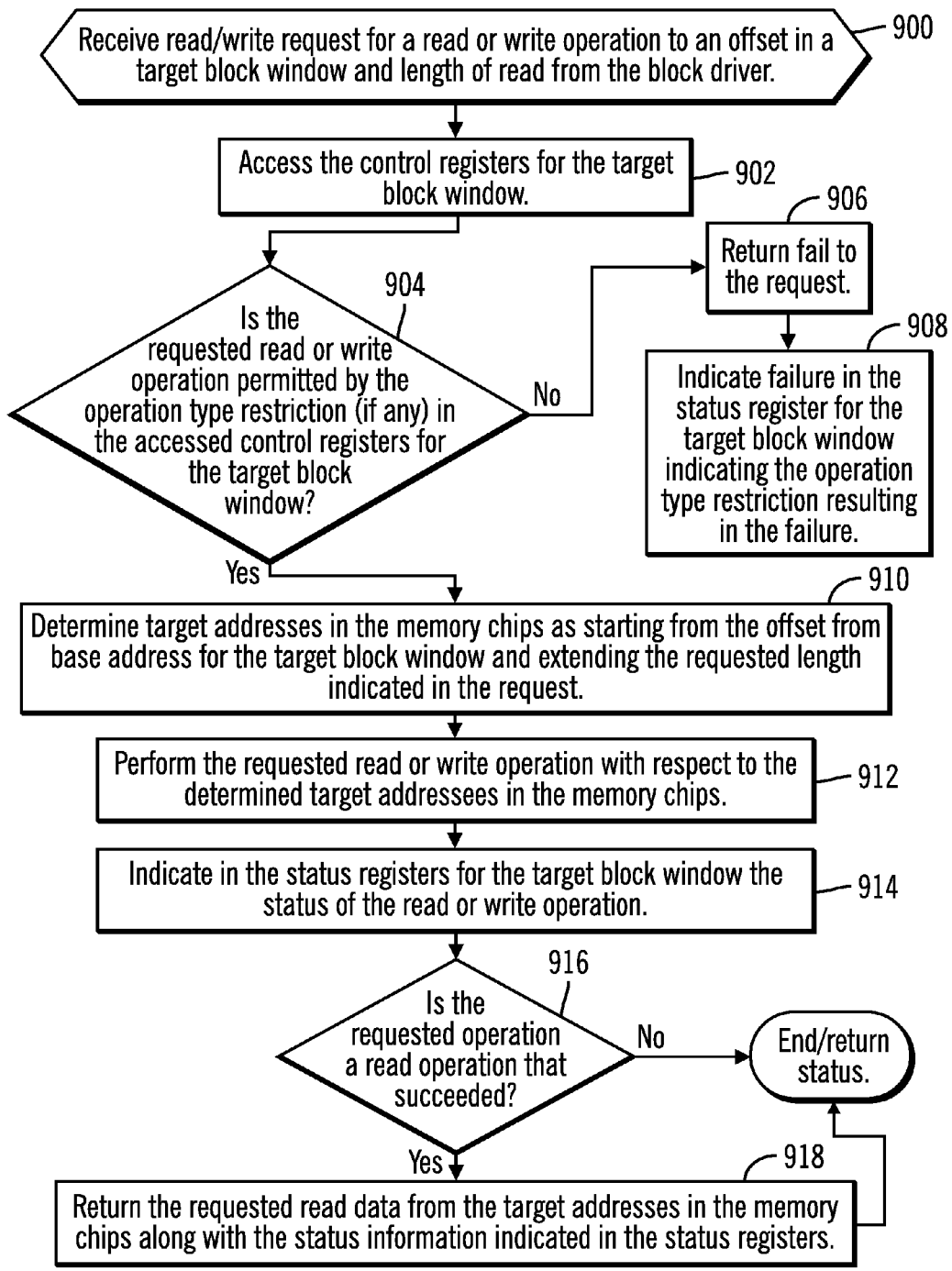
FIG. 9 illustrates an embodiment of operations to process a read/write request to a block window.

FIG. 9 illustrates an embodiment of operations performed by the memory module interface 206 to process a received read/write request 500. The read/write request 500 would originate at the block driver 104 and be forwarded by the host memory controller 110 to the memory module $200_i$ to which it is directed. Upon receiving (at block 900) a read/write request 500 for a read or write operation 502 to an offset 506 in a target block window $208_T$, indicated in target block window 504 of the request 500, for a length 508, the memory module interface 206 accesses (at block 902) the control registers $300_T$ for the target block window $208_T$. A determination is made (at block 904) as to whether the requested read or write operation 502 is permitted by the operation type restriction 308 for the block window 504 indicated in the block window control registers $300_T$ for the target block window $208_T$. If the operation type 502 is not permitted, then fail is returned (at block 906) to the request 500 and failure is indicated (at block 908) in the status register $212_T$ for the target block window $208_T$ indicating the operation type 502 that resulted in the failure.

If (at block 904) the operation type 502 is permitted, then the memory module interface 206 determines (at block 910) target addresses in the memory chips $204_1, 204_2 \ldots 204_3$ as starting from the offset 506 from the base address 304 for the target block window $208_T$, indicated in the control registers $300_T$, and extending the requested length 508 indicated in the request 500. In one embodiment, the starting address may be determined by adding the offset 506 to the base address 304 of the target block window $208_T$. Further, in certain embodiments, the length 508 may not be separately indicated when all windows have a same length. The memory module interface 206 then performs (at block 912) the requested read or write operation 502 with respect to the determined target addresses range in the memory chips $204_1, 204_2 \ldots 204_3$. The status of the read or write operation is indicated (at block 914) in the status registers $212_T$ for the target block window $208_T$. If (at block 916) the operation is a read operation that succeeded, then the requested read data from the target addresses in the memory chips $204_1, 204_2 \ldots 204_3$ is returned (at block 918) to the block driver 104 along with the status information for the read indicated in the target status registers $212_T$. If (at block 916) the operation is a write, then control ends, and status on the write operation may be returned, as indicated in the target status registers $212_T$.

With the described embodiments, the memory module may implement block windows that a storage driver 108 in the host operating system 106 uses to initiate parallel requests against block window s of data that map to memory addresses in the memory module. This allows a memory module, such as a NVDIMM, which typically provides cache line memory access, to provide a storage mode access which allows a host driver to access window blocks of data mapping to locations in the memory chips of the memory module.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as i, k, m and n, are used herein to denote a variable number of instances of an element, which may represent the same or different values, and may represent the same or different value when used with different or the same elements in different described instances.

Examples

The following examples pertain to further embodiments.

Example 1 is a memory module apparatus in a system for accessing data at addressable locations, comprising: at least one memory chip to store data in addressable locations; a memory module controller to perform read and write operation with respect to the memory chips, the memory module controller to: configure a plurality of block windows that map to addresses corresponding to the addressable locations in the memory chips; receive a read/write request indicating a requested read or write operation with respect to a target block window comprising one of the block windows; and perform the requested read or write operation with respect to the addresses that map to the target block window.

In Example 2, the subject matter of Examples 1 and 3-10 can optionally include that the memory module is a non-volatile Dual In-Line Memory Module (NVDIMM) and wherein the memory module controller provides cache line memory access to the memory chips and uses the block windows to provide storage block access to the memory chips.

In Example 3, the subject matter of Examples 1, 2 and 4-10 can optionally include that the memory module controller is further to: configure control registers for each of the block windows to indicate an address range of the addresses of the block window; in response to receiving the requested read or write operation, determine from the control registers for the indicated target block window target addresses mapping to the target block window, wherein the requested read or write operation is performed with respect to the determined target addresses.

In Example 4, the subject matter of Examples 1-3 and 5-10 can optionally include that the memory module controller is further to: configure status registers for each block window to indicate a status of an operation with respect to the addresses that map to the block window; and indicating a status of the requested read or write operation in the status registers for the target block window.

In Example 5, the subject matter of Examples 1-4 and 6-10 can optionally include that the requested read or write operation comprises a read operation from a host block driver, wherein the memory controller is further to: return the requested read data read from the target addresses to the host block driver; and return information on the status of the requested read operation from the status registers for the target block window to the host block driver.

In Example 6, the subject matter of Examples 1-5 and 7-10 can optionally include that the memory module controller is further to: indicate an operation type of a plurality of operation types in the control registers for each block window to indicate the operation type that is permitted with respect to the block window; and in response to receiving the requested read/write request, determine whether the requested read or write operation is permitted by the operation type indicated in the control registers for the target block window, wherein the requested read or write operations is performed in response to determining that the requested read or write operation is permitted by the operation type indicated in the control registers.

In Example 7, the subject matter of Examples 1-6 and 8-10 can optionally include that the control registers for each of the block windows indicates a base address at which the address range mapping to the block window starts, and wherein the requested read or write operation indicates an offset from the base address for the target block window at which the target addresses start, wherein the determining the target addresses comprises: combining the address offset with the base address for the target block window to determine a starting address of the target addresses, wherein the target addresses extend from the starting address for the requested read or write operation.

In Example 8, the subject matter of Examples 1-7 and 9-10 can optionally include that multiple read and write requests can be concurrently processed by the memory module controller against multiple of the block window addresses and concurrently processed to different cache lines for mapping to addresses in one of the block windows.

In Example 9, the subject matter of Examples 1-8 and 10 can optionally include that the memory module controller is further to: receive from a Basic Input Operating System (BIOS) in the system commands to configure a block mode address range of the memory chips to function as a storage device, wherein the block windows are configured within the block mode address range; receive a request to configure block windows in a requested address range of the memory chips; determine whether requested address range in which to configure the block windows is within the block mode address range; fail the request to configure block windows in response to determining that the requested address range to configure is outside of the block mode address range; and indicate an error in a status register of the request to configure block windows outside of the block mode address range.

In Example 10, the subject matter of Examples 1-9 can optionally include that a host block driver executing in an operating system of the system sends commands to the memory module controller to configure the plurality of the block windows.

Example 11 is a system, comprising: a host having a block driver; and at least one memory module, each memory module comprising: memory chips for storing data in addressable locations; a memory module controller that performs read and write operation with respect to the memory chips, to: configure a plurality of block windows that map to addresses corresponding to the addressable locations in the memory chips; receive from the block driver a read/write request indicating a requested read or write operation with respect to a target block window comprising one of the block windows; and perform the requested read or write operation with respect to the addresses that map to the target block window.

In Example 12, the subject matter of Examples 11 and 13-16 can optionally include that the memory module controller is further to: configure control registers for each of the block windows to indicate an address range of the addresses of the block window; in response to receiving the requested read or write operation from the block driver, determine from the control registers for the indicated target block window target addresses mapping to the target block window, wherein the requested read or write operation is performed with respect to the determined target addresses.

In Example 13, the subject matter of Examples 11, 12 and 14-16 can optionally include that the memory module controller is further to: indicate an operation type of a plurality of operation types in the control registers for each block window to indicate the operation type that is permitted with respect to the block window; and in response to receiving the requested read/write request from the block driver, determine whether the requested read or write operation is permitted by the operation type indicated in the control registers for the target block window, wherein the requested read or write operations is performed in response to determining that the requested read or write operation is permitted by the operation type indicated in the control registers.

In Example 14, the subject matter of Examples 11-13, 15, and 16 can optionally include that multiple read and write requests from the block driver can be concurrently processed by the memory module controller against multiple of the block window addresses and concurrently processed to different cache lines for mapping to addresses in one of the block windows.

In Example 15, the subject matter of Examples 11-14 and 16 can optionally include a Basic Input Operating System (BIOS), wherein the memory module controller is further to: receive from the BIOS commands to configure a block mode address range of the memory chips to function as a storage device, wherein the block windows are configured within the block mode address range; receive from the block driver a request to configure block windows in a requested address range of the memory chips; determine whether requested address range in which to configure the block windows is within the block mode address range; fail the request to configure block windows in response to determining that the requested address range to configure is outside of the block mode address range; and indicate an error in a status register of the request to configure block windows outside of the block mode address range.

In Example 16, the subject matter of Examples 11-15 can optionally include that the block driver sends commands to the memory module controller to configure the plurality of the block windows.

Example 17 is a method for performing read and write operation with respect to memory chips in a memory module, comprising: configuring a plurality of block windows that map to addresses corresponding to the addressable locations in the memory chips; receiving a read/write request indicating a requested read or write operation with respect to a target block window comprising one of the block windows; and performing the requested read or write operation with respect to the addresses that map to the target block window.

In Example 18, the subject matter of Example 17 can optionally include at least any one of:

(1) wherein the memory module is a non-volatile Dual In-Line Memory Module (NVDIMM) and wherein the memory module controller provides cache line memory access to the memory chips and uses the block windows to provide storage block access to the memory chips; and/or (2) configuring control registers for each of the block windows to indicate an address range of the addresses of the block window; in response to receiving the requested read or write operation, determining from the control registers for the indicated target block window target addresses mapping to the target block window, wherein the requested read or write operation is performed with respect to the determined target addresses; and/or (3) configuring status registers for each block window to indicate a status of an operation with respect to the addresses that map to the block window; and indicating a status of the requested read or write operation in the status registers for the target block window; and/or (4) wherein the requested read or write operation comprises a read operation from a host block driver, further comprising returning the requested read data read from the target addresses to the host block driver; and returning information on the status of the requested read operation from the status registers for the target block window to the host block driver; and/or (5) indicating an operation type of a plurality of operation types in the control registers for each block window to indicate the operation type that is permitted with respect to the block window; and in response to receiving the requested read/write request, determining whether the requested read or write operation is permitted by the operation type indicated in the control registers for the target block window, wherein the requested read or write operations is performed in response to determining that the requested read or write operation is permitted by the operation type indicated in the control registers; and/or (6) wherein the control registers for each of the block windows indicates a base address at which the address range mapping to the block window starts, and wherein the requested read or write operation indicates an offset from the base address for the target block window at which the target addresses start, wherein the determining the target addresses comprises: combining the address offset with the base address for the target block window to determine a starting address of the target addresses, wherein the target addresses extend from the starting address for the requested read or write operation; and/or (7) wherein multiple read and write requests can be concurrently processed by the memory module controller against multiple of the block window addresses and concurrently processed to different cache lines for mapping to addresses in one of the block windows; and/or (8) receiving from a Basic Input Operating System (BIOS) in the system commands to configure a block mode address range of the memory chips to function as a storage device, wherein the block windows are configured within the block mode address range; receiving a request to configure block windows in a requested address range of the memory chips; determining whether requested address range in which to configure the block windows is within the block mode address range; failing the request to configure block windows in response to determining that the requested address range to configure is outside of the block mode address range; and indicating an error in a status register of the request to configure block windows outside of the block mode address range; and/or (9) wherein a host block driver executing in an operating system of the system sends commands to the memory module controller to configure the plurality of the block windows.

Example 19 is a memory module controller for use with a memory module having a plurality of memory chips, having logic to: configure a plurality of block windows that map to addresses corresponding to the addressable locations in the memory chips; receive a read/write request indicating a requested read or write operation with respect to a target block window comprising one of the block windows; and perform the requested read or write operation with respect to the addresses that map to the target block window.

In Example 20, the subject matter of Examples 19 and 21 can optionally include: configure control registers for each of the block windows to indicate an address range of the addresses of the block window; in response to receiving the requested read or write operation, determine from the control registers for the indicated target block window target addresses mapping to the target block window, wherein the requested read or write operation is performed with respect to the determined target addresses.

In Example 21, the subject matter of Examples 19 and 20 can optionally include: indicate an operation type of a plurality of operation types in the control registers for each block window to indicate the operation type that is permitted with respect to the block window; and in response to receiving the requested read/write request, determine whether the requested read or write operation is permitted by the operation type indicated in the control registers for the target block window, wherein the requested read or write operations is performed in response to determining that the requested read or write operation is permitted by the operation type indicated in the control registers.

Example 22 is an apparatus, comprising: means for configuring a plurality of block windows that map to addresses corresponding to the addressable locations in the memory chips; means for receiving a read/write request indicating a requested read or write operation with respect to a target block window comprising one of the block windows; and means for performing the requested read or write operation with respect to the addresses that map to the target block window.

In Example 23, the subject matter of Examples 22 and 24 can optionally include: means for configuring control registers for each of the block windows to indicate an address range of the addresses of the block window; means for determining, in response to receiving the requested read or write operation, from the control registers for the indicated target block window target addresses mapping to the target block window, wherein the requested read or write operation is performed with respect to the determined target addresses.

In Example 24, the subject matter of Examples 22 and 23 can optionally include means for indicating an operation type of a plurality of operation types in the control registers for each block window to indicate the operation type that is permitted with respect to the block window; and means for determining, in response to receiving the requested read/write request, whether the requested read or write operation is permitted by the operation type indicated in the control registers for the target block window, wherein the requested read or write operations is performed in response to determining that the requested read or write operation is permitted by the operation type indicated in the control registers.

Example 30 is a machine-readable storage including machine-readable instructions, when executed, to implement a method or realize an apparatus or system as claimed in any preceding claim.

Example 31 is an apparatus comprising means to perform a method as claimed in any preceding claim.

What is claimed:

1. A memory module apparatus for receiving read and write operations from a host processor in a system, comprising:
   at least one memory chip to store data in addressable locations;
   a memory module controller to perform read and write operations with respect to the memory chips, the memory module controller to:
      configure a plurality of block windows in storage areas of the memory module controller that map to addresses corresponding to the addressable locations in the memory chips;
      receive a read or write operation with respect to a target block window comprising one of the block windows; and
      perform the read or write operation with respect to the addresses that map to the target block window.

2. The memory module apparatus of claim 1, wherein the memory module apparatus comprises a non-volatile Dual In-Line Memory Module (NVDIMM) and wherein the memory module controller provides cache line memory access to the at least one memory chip and uses the block windows to provide storage block access to the at least one memory chip.

3. The memory module apparatus of claim 1, wherein the memory module controller is further to:
   configure control registers for each block window of the block windows to indicate an address range of the addresses of the block window; and
   in response to receiving the read or write operation, determine from the control registers, for the target block window, target addresses mapping to the target block window, wherein the read or write operation is performed with respect to the determined target addresses.

4. The memory module apparatus of claim 3, wherein the memory module controller is further to:
   configure status registers for each block window to indicate a status of an operation with respect to the addresses that map to the block window; and
   indicate a status of the read or write operation in the status registers for the target block window.

5. The memory module apparatus of claim 4, wherein the read or write operation comprises a read operation from a host block driver, wherein the memory module controller is further to:

return read data for the read operation read from the target addresses to the host block driver; and return information on the status of the read operation from the status registers for the target block window to the host block driver.

6. The memory module apparatus of claim 3, wherein the memory module controller is further to:

indicate an operation type of a plurality of operation types in the control registers for each block window to indicate the operation type that is permitted with respect to the block window; and in response to receiving the read or write operation, determine whether the read or write operation is permitted by the operation type indicated in the control registers for the target block window, wherein the read or write operation is performed in response to determining that the read or write operation is permitted by the operation type indicated in the control registers.

7. The memory module apparatus of claim 3, wherein the control registers for each block window of the block windows indicates a base address at which the address range mapping to the block window starts, and wherein the read or write operation indicates an address offset from the base address for the target block window at which the target addresses start, wherein to determine the target addresses comprises:

combine the address offset with the base address for the target block window to determine a starting address of the target addresses, wherein the target addresses extend from the starting address for the read or write operation.

8. The memory module apparatus of claim 1, wherein multiple read and write operations can be concurrently processed by the memory module controller against addresses mapping to multiple of the block windows and concurrently processed to different cache lines for mapping to addresses in one of the block windows.

9. The memory module apparatus of claim 1, wherein the memory module controller is further to:

receive, from a Basic Input Operating System (BIOS) in the system, commands to configure a block mode address range of the at least one memory chip to function as a storage device, wherein the block windows are configured within the block mode address range;

receive a request to configure block windows in a requested address range of the memory chips;

determine whether requested address range in which to configure the block windows is within the block mode address range;

fail the request to configure block windows in response to determining that the requested address range to configure is outside of the block mode address range; and indicate an error in a status register of the request to configure block windows outside of the block mode address range.

10. The memory module apparatus of claim 1, wherein a host block driver executing in an operating system of the system sends commands to the memory module controller to configure the plurality of the block windows.

11. A system, comprising:

a host having a block driver; and at least one memory module that receives read and write operations from the host, each memory module comprising:

memory chips for storing data in addressable locations;

a memory module controller that performs read and write operations with respect to the memory chips, to:

configure a plurality of block windows in storage areas of the memory module controller that map to addresses corresponding to the addressable locations in the memory chips;

receive from the block driver a read or write operation with respect to a target block window comprising one of the block windows; and perform the read or write operation with respect to the addresses that map to the target block window.

12. The system of claim 11, wherein the memory module controller is further to:

configure control registers for each block window of the block windows to indicate an address range of the addresses of the block window; and in response to receiving the requested read or write operation from the block driver, determine from the control registers, for the target block window, target addresses mapping to the target block window, wherein the read or write operation is performed with respect to the determined target addresses.

13. The system of claim 12, wherein the memory module controller is further to:

indicate an operation type of a plurality of operation types in the control registers for each block window to indicate the operation type that is permitted with respect to the block window; and in response to receiving the requested read or write operation from the block driver, determine whether the read or write operation is permitted by the operation type indicated in the control registers for the target block window, wherein the read or write operations is performed in response to determining that the read or write operation is permitted by the operation type indicated in the control registers.

14. The system of claim 11, wherein multiple read and write operations from the block driver can be concurrently processed by the memory module controller against addresses mapping to multiple of the block windows and concurrently processed to different cache lines for mapping to addresses in one of the block windows.

15. The system of claim 11, further comprising:

a Basic Input Operating System (BIOS), wherein the memory module controller is further to:

receive, from the BIOS, commands to configure a block mode address range of the memory chips to function as a storage device, wherein the block windows are configured within the block mode address range;

receive from the block driver a request to configure block windows in a requested address range of the memory chips;

determine whether requested address range in which to configure the block windows is within the block mode address range;

fail the request to configure block windows in response to determining that the requested address range to configure is outside of the block mode address range; and indicate an error in a status register of the request to configure block windows outside of the block mode address range.

16. The system of claim 11, wherein the block driver sends commands to the memory module controller to configure the plurality of the block windows.

17. A method for processing read and write operations from a host processor with respect to memory chips in a memory module, comprising:
- configuring a plurality of block windows in storage areas of a memory module controller that map to addresses corresponding to addressable locations in the memory chips;
- receiving a read or write operation with respect to a target block window comprising one of the block windows; and
- performing the read or write operation with respect to the addresses that map to the target block window.

18. The method of claim 17, further comprising:
- configuring control registers for each block window of the block windows to indicate an address range of the addresses of the block window; and
- in response to receiving the read or write operation, determining from the control registers, for the target block window, target addresses mapping to the target block window, wherein the read or write operation is performed with respect to the determined target addresses.

19. The method of claim 18, further comprising:
- configuring status registers for each block window to indicate a status of an operation with respect to the addresses that map to the block window; and
- indicating a status of the read or write operation in the status registers for the target block window.

20. The method of claim 18, further comprising:
- indicating an operation type of a plurality of operation types in the control registers for each block window to indicate the operation type that is permitted with respect to the block window; and
- in response to receiving the read or write operation, determining whether the read or write operation is permitted by the operation type indicated in the control registers for the target block window, wherein the read or write operation is performed in response to determining that the read or write operation is permitted by the operation type indicated in the control registers.

21. The method of claim 17, wherein multiple read and write operations can be concurrently processed by the memory module controller against addresses mapping to multiple of the block windows and concurrently processed to different cache lines for mapping to addresses in one of the block windows.

22. The method of claim 17, further comprising:
- receiving from a Basic Input Operating System (BIOS) commands to configure a block mode address range of the memory chips to function as a storage device, wherein the block windows are configured within the block mode address range;
- receiving a request to configure block windows in a requested address range of the memory chips;
- determining whether requested address range in which to configure the block windows is within the block mode address range;
- failing the request to configure block windows in response to determining that the requested address range to configure is outside of the block mode address range; and
- indicating an error in a status register of the request to configure block windows outside of the block mode address range.

23. A memory module controller for use with a memory module having a plurality of memory chips that receives read and write operations from a host processor in a system, wherein the memory module controller has logic to:
- configure a plurality of block windows in storage areas of the memory module controller that map to addresses corresponding to addressable locations in the memory chips;
- receive a read or write operation with respect to a target block window comprising one of the block windows; and
- perform the read or write operation with respect to the addresses that map to the target block window.

24. The memory module controller of claim 23, further to:
- configure control registers for each block window of the block windows to indicate an address range of the addresses of the block window; and
- in response to receiving the read or write operation, determine from the control registers, for the target block window, target addresses mapping to the target block window, wherein the read or write operation is performed with respect to the determined target addresses.

25. The memory module controller of claim 24, further to:
- indicate an operation type of a plurality of operation types in the control registers for each block window to indicate the operation type that is permitted with respect to the block window; and
- in response to receiving the read or write operation, determine whether the read or write operation is permitted by the operation type indicated in the control registers for the target block window, wherein the read or write operation is performed in response to determining that the read or write operation is permitted by the operation type indicated in the control registers.

* * * * *